United States Patent
Al-Qanaei

(10) Patent No.: US 10,507,838 B1
(45) Date of Patent: Dec. 17, 2019

(54) SYSTEM AND METHOD FOR LIMITING VEHICLE SPEED

(71) Applicant: Ahmad Abdullah M. J. Al-Qanaei, Kuwait (KW)

(72) Inventor: Ahmad Abdullah M. J. Al-Qanaei, Kuwait (KW)

(*) Notice: Subject to any disclaimer, the term of this patent is extended or adjusted under 35 U.S.C. 154(b) by 0 days.

(21) Appl. No.: 16/408,369

(22) Filed: May 9, 2019

Related U.S. Application Data

(60) Provisional application No. 62/683,647, filed on Jun. 12, 2018.

(51) Int. Cl.
| | |
|---|---|
| *B60W 40/09* | (2012.01) |
| *B60K 28/06* | (2006.01) |
| *G06K 9/00* | (2006.01) |
| *B62D 1/04* | (2006.01) |
| *B60W 40/10* | (2012.01) |
| *B60W 40/105* | (2012.01) |
| *B60W 50/00* | (2006.01) |
| *B60W 40/08* | (2012.01) |

(52) U.S. Cl.
CPC ........... *B60W 40/09* (2013.01); *B60K 28/066* (2013.01); *B60W 40/105* (2013.01); *B62D 1/046* (2013.01); *G06K 9/00845* (2013.01); *B60W 2040/0872* (2013.01); *B60W 2050/0089* (2013.01); *B60W 2530/14* (2013.01); *B60W 2540/22* (2013.01)

(58) Field of Classification Search
CPC .............. B60W 40/09; B60W 40/105; B60W 2540/22; B60W 2530/14; B60W 2040/0872; B60W 2050/0089; B62D 1/046; G06K 9/00845; B60K 28/066
See application file for complete search history.

(56) References Cited

U.S. PATENT DOCUMENTS

| | | | |
|---|---|---|---|
| 4,706,072 | A | 11/1987 | Lkeyama |
| 6,590,499 | B1 | 7/2003 | D'Agosto |
| 8,427,326 | B2 | 4/2013 | Ben David |
| 8,983,732 | B2 | 3/2015 | Lisseman et al. |
| 9,047,170 | B2 | 6/2015 | Naboulsi |
| 2009/0099721 | A1 | 4/2009 | Imai et al. |
| 2011/0210867 | A1 | 9/2011 | Benedikt |
| 2011/0234413 | A1 | 9/2011 | Dobbs |
| 2011/0257846 | A1 | 10/2011 | Bennett |

(Continued)

FOREIGN PATENT DOCUMENTS

| | | |
|---|---|---|
| CN | 202294509 U | 7/2012 |
| CN | 106114218 A | 11/2016 |

*Primary Examiner* — Rodney A Butler
(74) *Attorney, Agent, or Firm* — Richard C. Litman

(57) ABSTRACT

The system for limiting vehicle speed includes a sensor and computer system for controlling the speed of a vehicle under predetermined conditions. The system is designed and constructed to sense a plurality of conditions while the vehicle is in motion and to record these conditions for analysis, should an accident occur. One feature of the system is to control the vehicle's throttle to slow the vehicle upon sensing two conditions: (1) high vehicle speed; and, (2) lack of proper contact by the driver's hands with the steering wheel. The system can also sense a driver's heartbeat and record this and other data in the computer's memory. The computer also includes a real-time clock and the data recorded is timestamped and can be used for analysis, should an accident occur.

6 Claims, 3 Drawing Sheets

(56) References Cited

U.S. PATENT DOCUMENTS

| | | |
|---|---|---|
| 2016/0001781 A1 | 1/2016 | Fung et al. |
| 2016/0068103 A1* | 3/2016 | McNew ................... B60Q 9/00 |
| | | 701/23 |
| 2017/0305349 A1* | 10/2017 | Naboulsi ................. B60R 1/025 |
| 2018/0197440 A1* | 7/2018 | Ramachandra ...... G09B 19/167 |

* cited by examiner

SYSTEM AND METHOD FOR LIMITING VEHICLE SPEED

CROSS-REFERENCE TO RELATED APPLICATION

This application claims the benefit of U.S. Provisional Patent Application Ser. No. 62/683,647, filed Jun. 12, 2018.

BACKGROUND

1. Field

The present invention relates to vehicle safety control systems, and in particular, system and method for limiting vehicle speed that relies on input from a steering wheel sensor to automatically limit the vehicle's speed.

2. Description of the Related Art

In recent years, the number of potential distractions for drivers has increased. This is in part due to the advent of portable electronics (e.g., mobile phones, MP3 players, etc.), which include a number of electronic distractions that encourage or tempt drivers to take one or more of their hands off of the steering wheel. For example, such portable electronics can require manually dialing or selecting a phone number in order to make a cell phone call, or manually texting messages and/or answering emails, or selecting which song to play on an attached MP3 player. In normal driving conditions both hands should be present on the steering wheel to be in full, safe control of the vehicle, following the "hands on the wheel, eyes on the road, mind on the drive" safety mantra. In particular, the lack of sufficient control of the vehicle during intervals of excessive speed leads to the inability to control the vehicle. Conventional steering wheels do not have the capability of detecting the driver's hand position during vehicle operation. Those vehicles that are equipped with such sensors often only respond with a warning to the driver to exercise more caution and grip the steering wheel with both hands, but do nothing further if the driver fails to comply with the warning.

Thus, a system and method for limiting vehicle speed solving the aforementioned problems is desired.

SUMMARY

The system and method for limiting vehicle speed includes a steering wheel sensor that interacts with the vehicle's microcomputer or microcontroller system for controlling the speed of a vehicle under predetermined conditions. The system is designed and constructed to sense a plurality of conditions while the vehicle is in motion and to record these conditions for analysis, should an accident occur. One feature of the system is to control the vehicle's throttle to slow the vehicle upon sensing two conditions: (1) high vehicle speed; and (2) lack of proper contact by the driver's hands with the steering wheel. The system can also sense a driver's heartbeat and record this and other data in the microcomputer's memory. The microcomputer also includes a real-time clock and the data recorded is time-stamped and can be used for analysis, should an accident occur.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
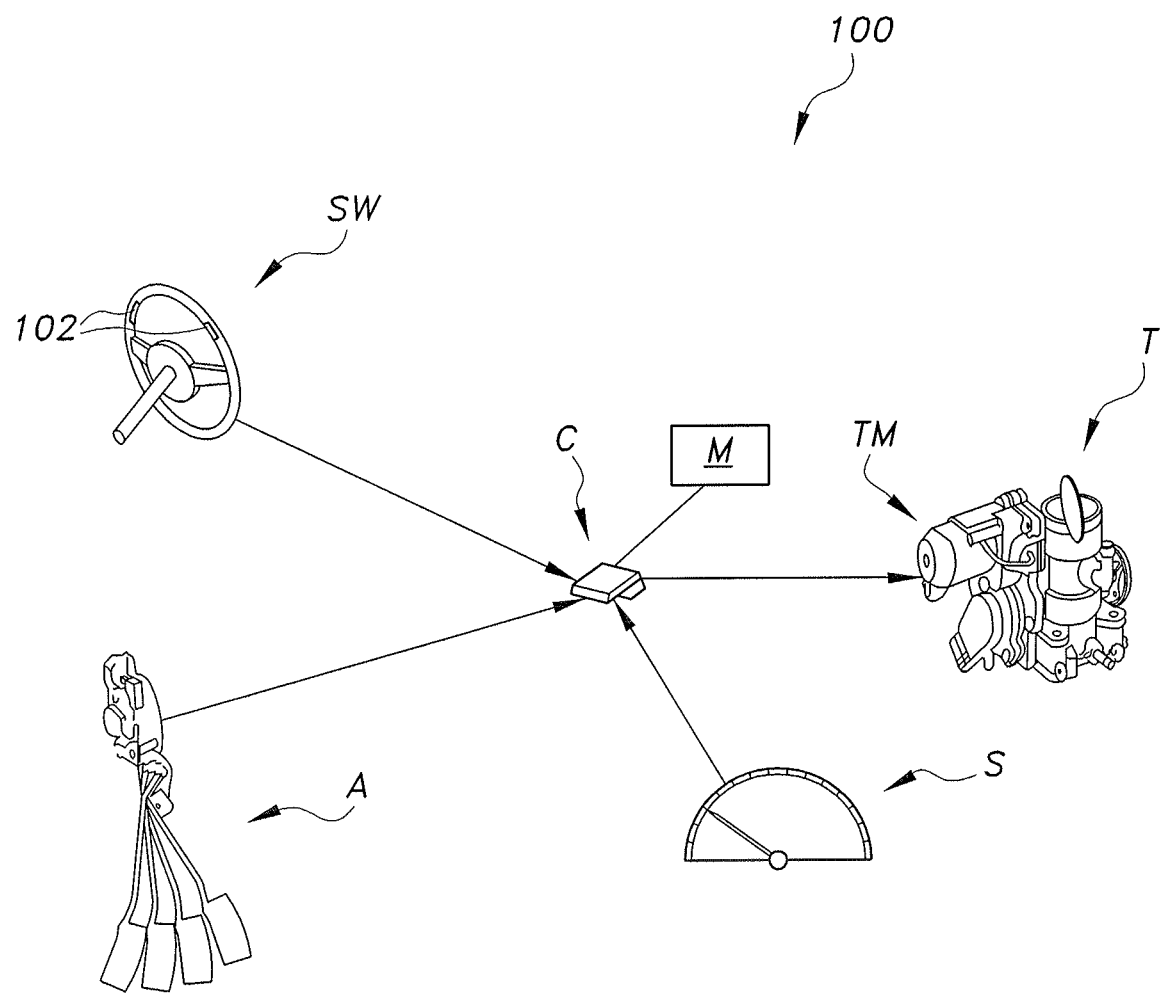
FIG. 1 is a block diagram of a system for limiting vehicle speed.

A block diagram of the system 100 for limiting vehicle speed is shown in FIG. 1. The system 100 includes several components, including a vehicle engine computer C (usually an on-board microcomputer or microcontroller implementing electronic engine controls); an accelerator pedal A having a sensor for providing a signal to the vehicle engine computer C indicative of the distance the accelerator pedal A has been depressed; and a throttle T with a throttle motor TM or actuator for opening and closing the throttle based on a drive signal from the vehicle engine computer C. The system also includes an electronic speedometer S for providing a signal to the vehicle engine computer C indicative of the speed of the vehicle. The electronic speedometer S is a common component in vehicles with cruise (or speed) control. The vehicle engine computer C includes memory M including both read-only memory (ROM) and random access memory (RAM) for storing and executing an algorithm that controls the computer outputs based on the algorithm and the sensor inputs to the vehicle engine computer C. The memory M is generally housed with the vehicle engine computer C and also includes memory allocated for data logging, as described below. The system further includes two steering wheel sensors 102 mounted on the steering wheel SW for sensing a driver's hands when they are placed on the sensors 102. A signal from each sensor 102 is sent to the vehicle engine computer C, as described below.

Figure 2A:
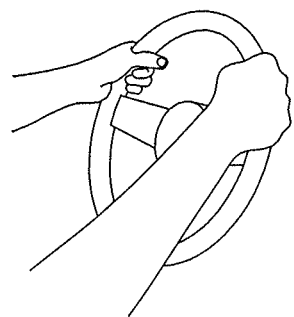
FIG. 2A is an environmental perspective view showing a driver's hands placed correctly on a steering wheel.
Figure 2D:
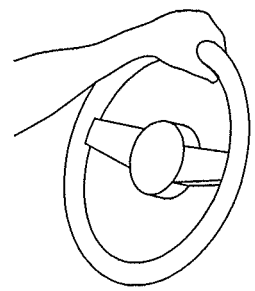
FIGS. 2B, 2C, 2D, 2E, and 2F are environmental perspective views showing examples of incorrect placement of a driver's hands on a steering wheel.
Figure 2B:
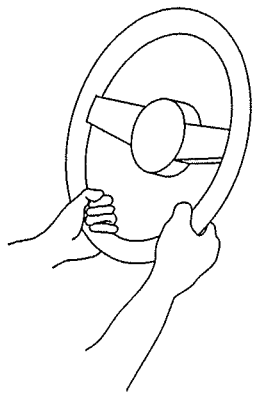
Figure 2E:
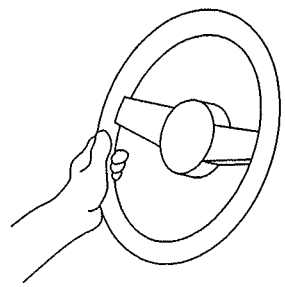
Figure 2C:
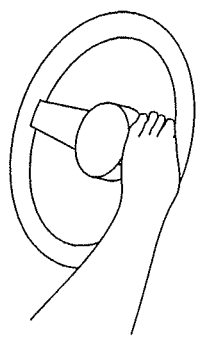
Figure 2F:
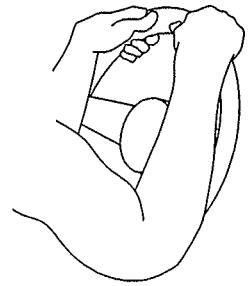

The two sensors 102 may be externally attached to or embedded in the front surface of the steering wheel and may be simple electrical switches that are actuated by the hands of the driver when properly placed on the steering wheel. As shown in FIG. 1, the two sensors 102 are mounted on the 2 o'clock (right hand) and 10 o'clock (left hand) clock positions of the steering wheel SW. These positions (see FIG. 2A) are commonly considered to be the most preferred position for the hands of a driver when manipulating a steering wheel. It should be understood, however that other positions could be employed, or only a single sensor could be employed, depending on the specific physical capabilities of the intended driver. Other positions that are generally considered less optimal are shown in FIGS. 2B through 2F. Both single hand (FIGS. 2C 2D and 2E) and double hand (FIGS. 2B and 2F) less desirable examples are shown. The two sensors 102 thereby sense the proper positioning of both hands of the driver on the steering wheel.

Figure 3:
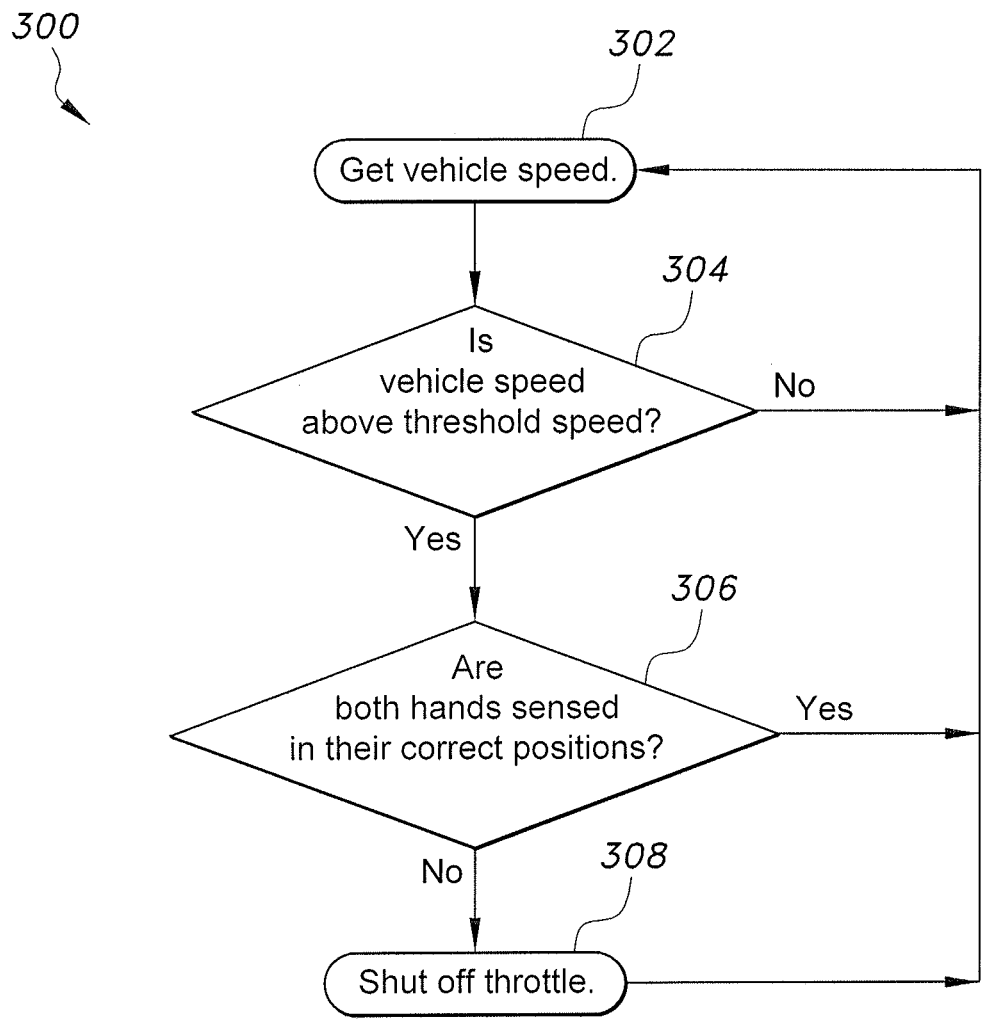
FIG. 3 is a flowchart showing the steps of a method for limiting vehicle speed based on the sensed positions of a driver's hands on a steering wheel using the system for limiting vehicle speed of FIG. 1.

A flowchart 300 showing the steps of a method of limiting vehicle speed is shown in FIG. 3. It should be understood that the method 300 may be achieved in the form of a subroutine embedded in the overall control algorithm stored in the memory of and implemented on the vehicle engine computer C. In step 302, the current vehicle speed is input from the electronic speedometer S. In step 304 the current vehicle speed is compared with a threshold speed. The threshold speed may be adjustable depending on driving conditions, the age of the driver, or any physical impairments he or she may have. Ideally the threshold speed is relatively low. If the current vehicle speed is below the threshold speed, the method returns to step 302 and the vehicle speed is not affected. If the current vehicle speed is equal to or above the threshold speed the method proceeds to step 306, where the signals from the steering wheel sensors 102 are checked to ensure that both hands are in their correct position. If both hands are in their correct position, the method returns to step 302 and the vehicle speed is not affected. If one or both hands are not in their correct position, the method proceeds to step 308, where the throttle motor TM is automatically activated to shut off or close the throttle to reduce vehicle speed. The method then returns to step 302 and the conditions are again checked. The vehicle speed continues to be reduced until the current vehicle speed is below the threshold speed or until both hands are placed in their correct position.

The system and method for limiting vehicle speed also includes auxiliary functions, similar to black boxes on aircraft. As opposed to simple electrical switches, preferably one or both of the sensors 102 are pressure sensors that are also capable of sensing a physiological condition of the driver, such as the pulse rate of the driver, while gripping the steering wheel. Some examples of these types of sensors are as described and cited in U.S. Pat. Nos. 9,047,170 and 8,983,732, the contents of which are hereby incorporated by reference in their entirety. When a driver holds the steering wheel with both hands, the control algorithm controls the vehicle engine computer C to automatically record the pulse rate sensed by sensors 102 and the speed of the vehicle from the electronic speedometer S. This data, and all the recorded data, is timestamped for reference in case the vehicle is involved in an accident. The vehicle engine computer C also records if heart failure occurred when the air bag is deployed (or explodes). The data recorded can help prove that the accident occurred while the driver was holding the steering wheel by both hands until the accident occurred. This data can help prove that the accident occurred due to mismanagement of the driver or due to a technical malfunction in the car. Other data that may be recorded by the vehicle engine computer C includes: engine heat; oil pressure; gasoline pressure in the fuel system of the vehicle; the condition of each engine piston separately; and whether there is a defect in one of the pistons; a faulty ignition system, the position of the throttle (open, closed or an intermediate position). All of this and other data may be useful for investigators in the process of investigating traffic accidents.

It is to be understood that the system and method for limiting vehicle speed is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. In combination, a vehicle and a system for limiting speed of the vehicle, the vehicle having:
   a throttle movable between an open position and a closed position;
   an accelerator pedal manually operable by an operator of the vehicle, the accelerator pedal moving the throttle between the open position and the closed position to vary the speed of the vehicle;
   a speedometer for displaying the speed of the vehicle;
   a steering wheel; and
   a vehicle engine computer having memory for storing computer readable instructions and a processor for executing the computer readable instructions when loaded into main memory;
the system consisting of:
   a speed sensor connected to the speedometer, the speed sensor generating a first input signal to the vehicle engine computer corresponding to the speed of the vehicle;
   steering wheel sensors mounted on the steering wheel, the steering wheel sensors comprise a first steering wheel sensor and a second steering wheel sensor, the steering wheel sensors being mounted in spaced apart respective first and second distinct positions on the steering wheel, the first steering wheel sensor generating a second input signal to the vehicle engine computer corresponding to the presence or absence of a hand of the operator of the vehicle on the first steering wheel sensor at the first distinct position, the second steering wheel sensor generating a third input signal to the vehicle engine computer corresponding to the presence or absence of a hand of the operator being placed on the second steering wheel sensor at the second distinct position;
   a throttle motor connected to the throttle, the throttle motor being operable to move the throttle towards the closed position to reduce the speed of the vehicle upon receiving a throttle motor actuation signal; and
   a set of computer readable instructions stored in the memory of the vehicle engine computer, the instructions including:
      a first set of instructions, which, when loaded into main memory, cause the processor to compare the first input signal to a threshold speed;
      a second set instructions, which, when loaded into main memory, cause the processor to determine the presence or absence of a hand of the operator of the vehicle on the at least one steering wheel sensor from the second input signal;
      a third set of instructions, which, when loaded into main memory, cause the processor to output a throttle actuation signal to the throttle motor to automatically move the throttle towards the closed position to reduce the speed of the vehicle, regardless of the position of the accelerator pedal, when the first input signal is greater than or equal to the threshold speed and the second input signal indicates the absence of a hand of the operator of the vehicle on the at least one steering wheel sensor; and
      a fourth set of instructions, which, when loaded into main memory, cause the processor to output a throttle actuation signal to the throttle motor to automatically move the throttle towards the closed position to reduce the speed of the vehicle, regardless of the position of the accelerator pedal, only when the first input signal is greater than or equal to the threshold speed and the second and third input signals indicates the absence of a hand of the operator of the vehicle from at least one of the steering wheel sensors.

2. The combination according to claim 1, wherein the first steering wheel sensor and the second steering wheel sensor are externally attached to a front surface of the steering wheel.

3. The combination according to claim 1, wherein the first steering wheel sensor and the second steering wheel sensor are embedded in a front surface of the steering wheel.

4. The combination according to claim 1, wherein the first steering wheel sensor is in a 2 o'clock position on the steering wheel and the second steering wheel sensor is in a 10 o'clock position on the steering wheel.

5. The combination according to claim 1, wherein the first steering wheel sensor and the second steering wheel sensor are pressure sensors, the pressure sensors being capable of sensing a pulse rate of the operator of the vehicle.

6. The combination according to claim 5, wherein said set of computer readable instructions further comprises a fifth set of instructions, which, when loaded into main memory, cause the processor to record the pulse rates detected by the first and second steering wheel sensors and the speed of the vehicle when the second and third input signals indicate the presence of a hand of the operator of the vehicle on both the first and second steering wheel sensors.

\* \* \* \* \*